United States Patent [19]

Kingstone

[11] Patent Number: 5,617,497

[45] Date of Patent: *Apr. 1, 1997

[54] LATERAL ILLUMINATION FIBER OPTIC CABLE DEVICE AND METHOD OF MANUFACTURE

[75] Inventor: Brett M. Kingstone, Orlando, Fla.

[73] Assignee: Super Vision International, Inc., Orlando, Fla.

[ * ] Notice: The term of this patent shall not extend beyond the expiration date of Pat. No. 5,333,228.

[21] Appl. No.: 361,986

[22] Filed: Dec. 22, 1994

Related U.S. Application Data

[63] Continuation-in-part of Ser. No. 277,887, Jul. 20, 1994, which is a continuation of Ser. No. 65,942, May 21, 1993, Pat. No. 5,333,228.

[51] Int. Cl.⁶ ............................................. G02B 6/44
[52] U.S. Cl. ................................. 385/100; 385/901
[58] Field of Search ........................... 385/100, 102, 385/104, 106, 112, 115, 901

[56] References Cited

U.S. PATENT DOCUMENTS

| | | | |
|---|---|---|---|
| 4,907,132 | 3/1990 | Parker | 385/901 |
| 4,961,617 | 10/1990 | Shahidi et al. | 385/901 |
| 4,989,933 | 2/1991 | Duguay et al. | 385/901 |
| 5,345,531 | 9/1994 | Keplinger et al. | 385/901 |
| 5,400,224 | 3/1995 | Dunah et al. | 385/901 |
| 5,416,875 | 5/1995 | Keplinger et al. | 385/901 |

*Primary Examiner*—Rodney B. Bovernick
*Assistant Examiner*—Robert E. Wise

[57] ABSTRACT

A fiber optic cable suitable for lateral illumination lighting installations has a central core, wrapped perimetrically with angularly distributed bundles of optical fibers and covered with a transparent sheath. In one form, the core includes an outer cylindrical surface of reflective material that deflects inwardly directed lateral emissions back outwardly so they can contribute usefully to the visible light. In another form, the core may be reflective or non-reflective and include material enabling the cable to be bent or formed into various shapes. In still another form, the cable includes in combination an outer channel of opaque material with cutout designs formed in the channel for lateral illumination to shine through. In manufacture, the bundles are wound about the core by a cabling machine which simultaneously extrudes the sheath about the winding. In a modified embodiment, a cable includes an arcuate cutout that mates with a complementary track of a mounting strip. In another form of the modified embodiment, the fiber bundles are provided directly within at least one reflective channel formed integrally within the mounting strip.

17 Claims, 3 Drawing Sheets

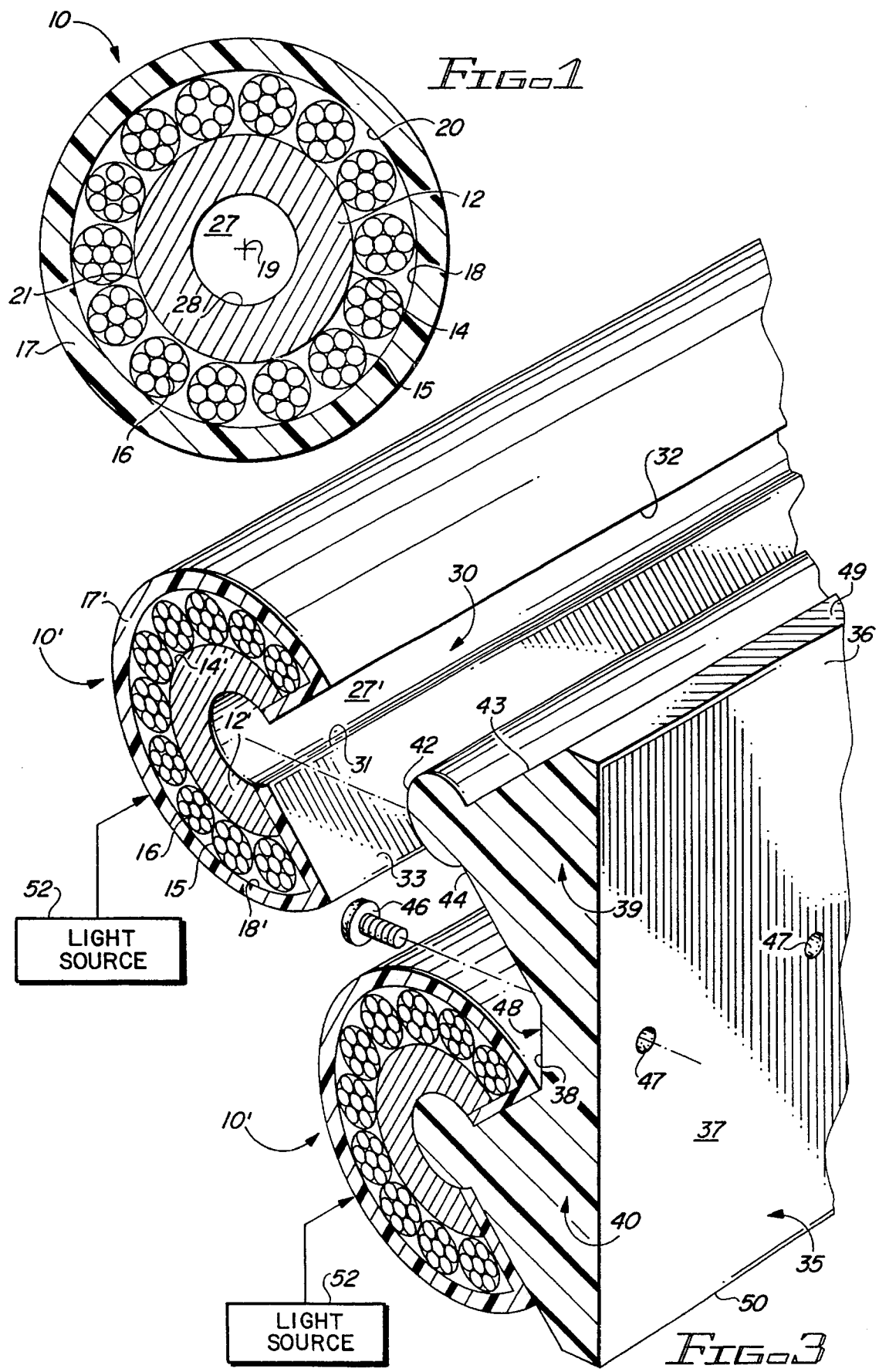

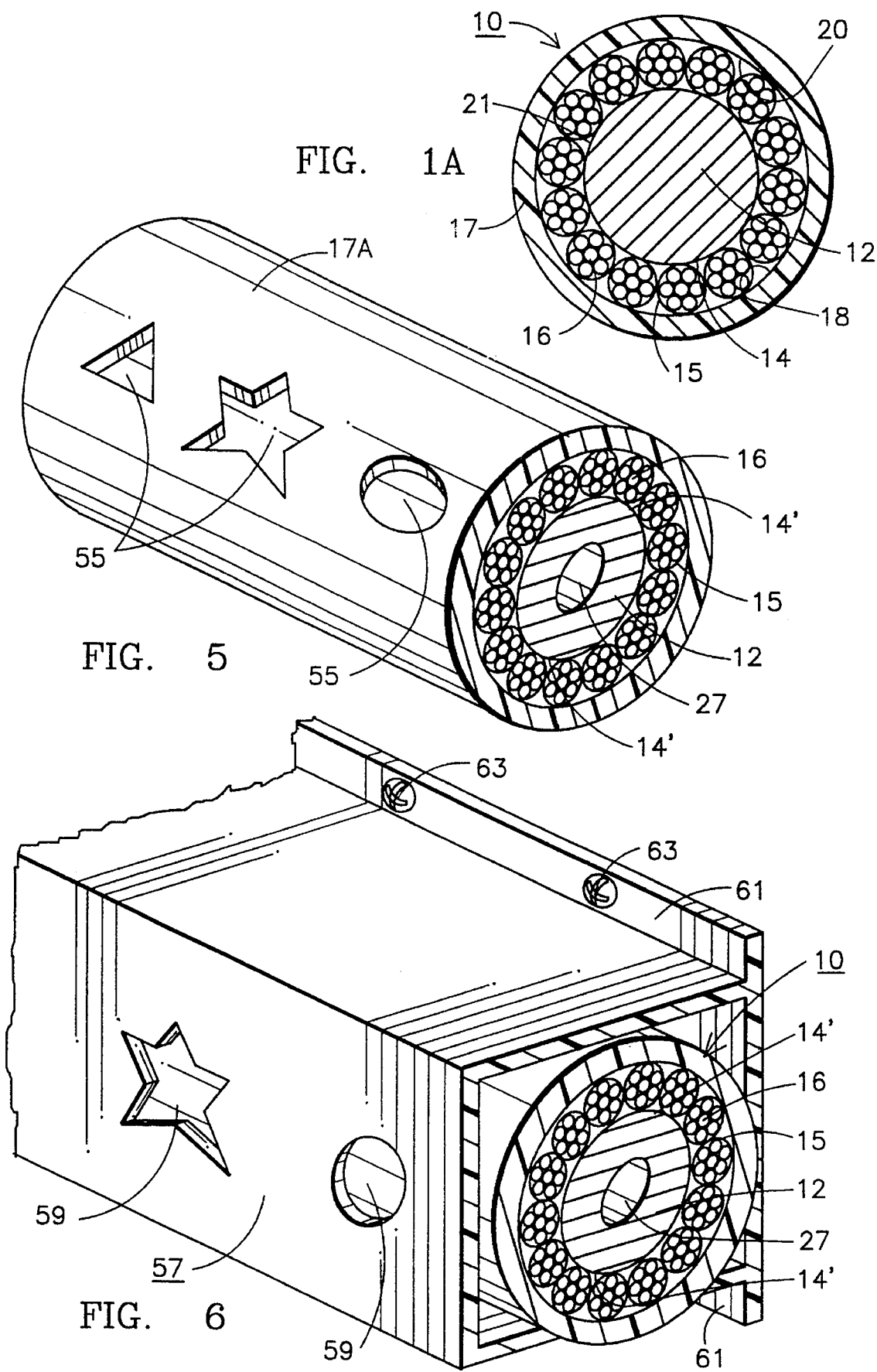

LATERAL ILLUMINATION FIBER OPTIC CABLE DEVICE AND METHOD OF MANUFACTURE

This is a continuation-in-part of application Ser. No. 08/277,887 filed Jul. 20, 1994 which is a continuation of application Ser. No. 08/065,942, filed May 21, 1993, now U.S. Pat. No. 5,333,228.

This invention relates to fiber optic lighting, in general; and, in particular, to an improved fiber optic cable providing illumination through lateral transmission of light, and to a method of manufacture thereof.

BACKGROUND OF THE INVENTION

An "optical fiber" is an elongated glass or plastic filament having a core region surrounded by one or more layers of cladding, with the core having a higher index of refraction than the cladding, so that light introduced at one end of the fiber will be internally reflected for transmission longitudinally within the core channel, to the other end of the fiber. A "fiber optic cable" comprises a sheath surrounding a multiplicity of optical fibers. For further details on optical fibers, see, e.g., U.S. Pat. No. 4,744,631, the disclosure of which is incorporated herein.

In addition to transmitting light in a longitudinal mode, conventional fiber optic cable also transmits light laterally. For data communications, an effort is made to minimize such lateral transmission; however, the lateral illumination is useful for area lighting or spotlighting, such as around swimming pools, walkways, signs, and other safety and decorative accent lighting applications. Attempts have been made in this context to maximize lateral emissions to provide uniform sideways lighting or "glow" over the length of the cable.

Examples of lateral illumination fiber optic cable devices used for safety or decorative illumination purposes are given in U.S. Pat. Nos. 4,933,815 and 4,763,984, the disclosures of which are incorporated herein. Such fiber optic cables or light channels utilize special methods of fabrication, such as the inclusion of actinically-sensitive dyes or other light-scattering materials in the core, to aid in enhancing lateral scattering of the incident light flux.

Other approaches, which do not require specially fabricated fibers, simply bundle large numbers of fibers over each other, either individually or in helically wound groups and cover the same with a clear plastic jacket or cable. Such bundles are not efficient from the aspect of cost and illumination. The central fibers in the cable are wasted due to the fact that the central core of fibers in such cables does not contribute to the visible illumination. Moreover, the central fibers may actually detract from the lateral mode transmissions of the perimetric fibers by causing absorption and attenuation of the light directed toward the center.

SUMMARY OF THE INVENTION

It is an object of the present invention to provide an efficient and cost-effective lateral illumination fiber optic cable device wherein the wasted central core placement of optical fibers is eliminated.

It is a further object of the invention to provide a lateral illumination fiber optic cable device wherein light directed inwardly from the perimetric fibers is re-deflected outwardly.

It is yet another object of the invention to provide a lateral illumination fiber optic cable device having convenient means for mounting a length of fiber optic cable to a supporting structure.

In accordance with one aspect of the invention, a fiber optic cable has a multiplicity of optical fibers located perimetrically in an annular region between a reflective tubular central core and an outer transparent tubular sheath. In one arrangement, described in greater detail below, the cable has a plurality of bundles of fibers, uniformly distributed at equiangular intervals about a tube covered with a reflective tape or coating. In a second arrangement discussed below, a plurality of such cables are provided with arcuate cutouts and hollow core regions which fit over complementary projections of corresponding attachment tracks of lineally extending reflective mounting strips or by placing the cable in a separately extruded opaque track where decorative designs are stamped out to allow the light generated from the cable to show through. A method of manufacturing the cable includes cabling, wrapping or winding the bundles of fibers about the perimeter of a tubular core, while passing the same through an extruder to apply a clear plastic jacket or sheath thereover. The sheath material is injected with a UV stabilizer during manufacture to protect the cable from yellowing due to the sun, and a clear protective cape is used around the bundles to prevent the fibers from being melted during the extrusion process. In another form, the outer sheath is formed of opaque material with multiple cut-out segments of various shapes for passing lateral illumination. The cable may also be formed with a flexible, memory retentive core so as to be bent into various shapes.

The improved perimetrical arrangement eliminates the need for wasted central core fibers and the reflective central core of the improved cable serves to deflect inwardly directed laterally transmitted light back out towards the perimeter of the cable, thereby enhancing the brightness of the cable while reducing the number of fibers needed to produce the same diameter cable. Brightness of the lateral illumination can be varied by changing the reflectivity characteristics of the central core. For example, minimal reflectivity can be implemented with a black central core.

In accordance with another aspect of the invention, pluralities of pregrouped bundles of fibers are inserted through interior channels formed directly along the front surface of lineally extending reflective mounting strips. In a third arrangement discussed below, bundles of fibers are collected into upper and lower groupings, the groupings are respectively covered with clear protective capes, and then the caped groups are passed through an extruder which forms a mounting strip about the groupings or slipped into an axially extending opening in a preformed strip. The strip may be transparent, translucent or opaque. The opaque strip includes apertures of passing lateral illumination.

BRIEF DESCRIPTION OF THE DRAWINGS

Embodiments of the invention have been chosen for purposes of illustration and description, and are shown in the accompanying drawings, wherein:

FIG. 1 is a cross-section view of a lateral illumination fiber optic cable device in accordance with one embodiment of the present invention;

FIG. 1A is a cross-section view of a lateral illumination fiber optic cable device in accordance with another embodiment of the present invention;

FIG. 3 is a fragmentary perspective view, in section, showing a modified embodiment of the cable device of FIG. 1, employed in a track lighting system;

FIG. 5 is a fragmentary perspective view of an another embodiment of the invention; and FIG. 6 is a fragmentary perspective of another form of the modified embodiment of FIG. 5.

Throughout the drawings, like elements are referred to by like numerals.

DETAILED DESCRIPTION OF PREFERRED EMBODIMENTS

Figure 2:
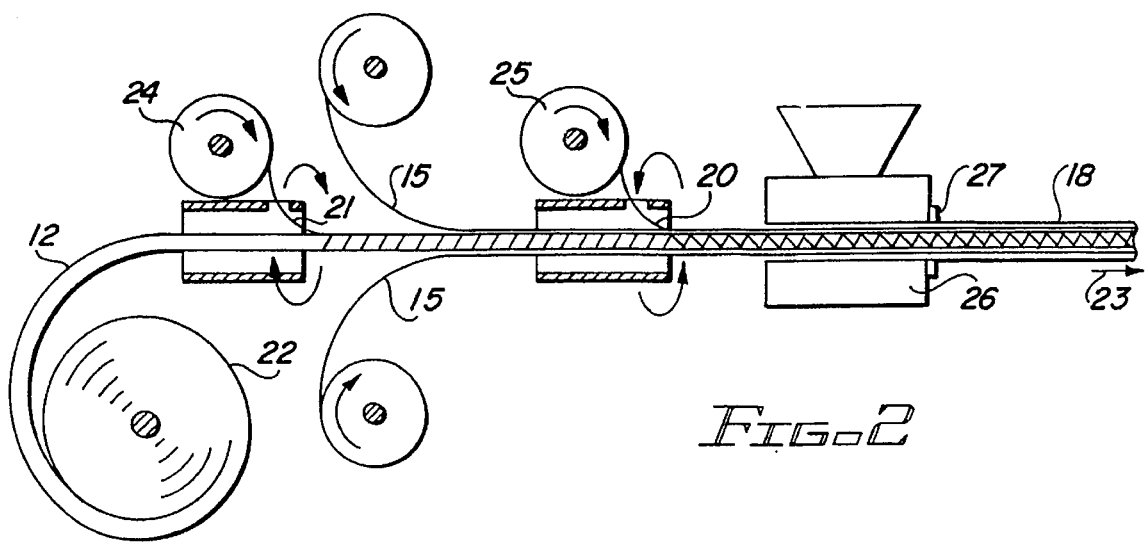
FIG. 2 is a schematic view of a manufacturing precess suitable for forming the cable device of FIG 1.

As shown in FIGS. 1 and 1A, a lateral illumination fiber optic cable device 10 includes a central core member 12 in the form of a longitudinally extending, hollow tube or a solid, preferably flexible material. While it is preferable that the member 12 have a circular cross-section, the member 12 could have an oval or other shaped cross-section as will become apparent. The member 12 is made of a reflective material, or is coated, or otherwise associated with reflective material to impart light reflectance to an outer surface 14. A plurality of prepackaged bundles 15 of optical fibers 16 is distributed circumferentially about the perimeter of the core member 12 to extend axially in contact with the reflective surface 14. While the bundles 15 may be uniformly distributed, it may be desirable to establish a non-uniform, circumferential distribution to impart particular light patterns to the device 10. While it is generally preferable to utilize a reflective core to increase lateral light output, it may be appropriate in some instances to use a less-reflective core simply to disperse the fiber optic bundles to create a large diameter, more visible cable device. It may also be desirable to wrap the bundles 15 about a core member 12 formed of a communication cable, such as an RG-57, or other type of large cable so that the core member 12 has the dual function of dispersing the bundles 15 (or individual optical fiber) and carrying electrical signals.

The bundles 15 are, in turn, covered with a clear plastic tubing or casing sheath 17 which has an inside surface 18 in contact with the radial extremities of the bundles 15. The sheath 17 runs longitudinally, coaxially of the core member 12, with the bundles being distributed about a common longitudinal axis 19 in an annular region formed in the space between the surfaces 14, 18. The bundles 15 may be laid straight, or helically wound about core member 12, in the axial direction.

In a typical application, a length of cable 10 will be mounted around a swimming pool, walkway, sign or similar structure, and illuminated by coupling light flux into one or both ends using a light source, such as one of the type generally described in U.S. Pat. Nos. 4,825,341; 4,922, 385and 5,016,152, the disclosures of which are incorporated herein by reference. Each cable end to be illuminated is stripped back to remove like lengths of sheath 17 and core member 12, leaving the remaining bundle ends to be gathered together for efficient light input. Unlike prior art cables, wherein laterally transmitted, inwardly directed light is attenuated and "lost" within the cable center, light emitted inwardly by the fibers 16 of the device 10 will be reflected by the surface 14, out towards the perimeter of the cable 10. There is, thus, no necessity to fill the core region with fibers, as done conventionally. On the contrary, the action of reflection at surface 12 enhances the brightness of the "glowing" cable, while reducing cost compared to equal diameter conventional cables which needlessly fill the core with additional fibers. However, for reduced light output, which might be desirable in a darkened theater, the inner core member 12 may have a less reflective surface and still have the advantage of fewer bundles 15.

In a preferred embodiment of manufacture, commercially available bundles 15 of helically-twisted fibers 16 are cabled, wrapped or wound over a white or silver reflective PVC plastic tubing or a solid core member 12, then passed through a plastic extruding machine, which will lay a clear PVC plastic tubing jacket 18 over the bundle-wrapped core to serve as a protective outer shell. In the preferred embodiment, a UV stabilizer is injected into the tubing 18 as it is being formed to protect the cable from yellowing due to the rays of the sun, and a cape 20 of clear Mylar™ or Teflon™ tape is wound around the outside diameter of the bundle layer, to keep the bundles 15 from unraveling during the cabling process and to prevent the fibers 16 from being melted during the process of extruding the jacket 18 over the bundle wrapping. For enhancement of the reflectance, or as an alternative to using a reflective core member 12, the outer surface of member 12 may be wrapped with a layer of aluminum foil or Mylar™ (foil-side out) tape 21, or coated with $TiO_2$ or white reflective paint.

One approach to implementing the manufacturing process is illustrated in FIG. 2. A length of flexible core member 12 is drawn off a roll 22 and fed in an axial direction 23. A tape dispenser 24 is rotated about member 12 to wrap a length of reflective tape 21 helically about member 12. A plurality of fiber bundles 15 are then laid longitudinally, at equiangular intervals, along the reflective tape covered member. A second tape dispenser 25 is then rotated about member 12, in a direction counter to the rotation of dispenser 24, to wrap a length of clear protective tape 20 helically about the bundled member 12. The protective tape-wrapped member is then fed centrally through an extruder 26 having a die 27 which forms a jacket 18 over the bundle wrapping, thereby producing the finished cable 10.

Essentially the same process can be used to create a cable device in which the fiber optics cables are not constrained in bundles 15. Rather, individual optical fibers could be dispersed in place of bundles 15. Further, the rolls 15A could be mounted for rotation about member 12 in the same manner as roll 24 so that the optical fibers could be woven about member 12. This would form a cable having a center core with an outer layer of optical fibers or multiple overlapping optical fiber layers creating various optical designs.

For manufacture of a 0.580" 98-element fiber optic cable, core member 12 can suitably be constituted by a 0.312" OD×0.156" ID PVC tube; sheath 17 can be a 0.040" dia. transparent PVC jacket; and bundles 15 can comprise 14 evenly distributed bunches of 7×0.030" fiber optic elements. Utilizing a central core of reflective material, the fibers are efficiently placed, so that their contributions to the externally visible illumination are not wasted by being lost due to placement in the central core region.

The hollow 27 of tube 12 is left devoid of fibers currently contributing to the visible lateral illumination. Hollow 27 may, however, be optionally utilized to extend electrical wiring to remote light sources, to extend fibers to carry light to serially mounted cables or signaling devices, or for other similar conduit purposes. Where light is to be communicated by longitudinal transmission through hollow 27, the inside surface 28 of tube 12 may also be made reflective. Such treatment will reflect lateral emissions back to the internally located fibers to enhance longitudinal transmission through the shielded center of the core region. The core can also be made of a solid material instead of a hollow tube.

In an alternative form, core member 12 may be produced from a flexible, memory retentive material which can be bent or formed into different shapes and will retain such shape. For example, member 12 could be formed from a drawn, ferromagnetic material similar to coat-hanger wire which can be bent into various shapes and will retain its shape. Other flexible, shape retentive materials are known. The resulting product or cable can be used to create designs, letters, optical artwork and sculptures. Alternately, a flexible, memory retentive wire or rod could be inserted through hollow 27 of tube 12 alone or along with other electrical conductors in order to impart the above bending characteristics to cable 10.

FIG. 3 shows a modified arrangement 10' of cable device 10, wherein an arcuate segment cutout 30 of approximately 90° has been made cross-sectionally to run the entire length of the cable 10'. Cutout 30 provides a longitudinal opening 31 into the hollow 27' of the tubing 12'. The opening 31 is bounded by radially directed walls 32, 33 which are formed by inwardly directed flanges of a C-shaped cross-sectioned transparent sheath 17'. Bundles 15 of fibers 16, identical with those of cable 10, fill the arcuate annular region formed in the spacing between the outside surface 14' of tube 12' and the inside surface 18' of sheath 17'. For the example shown, the space is filled by 70 fibers constituted by 10 bundles of seven fibers each.

In accordance with a further aspect of the invention, a longitudinally extending mounting strip 35 has a base 36 with a vertically planar rear surface 37 and a front surface 38 having forwardly projecting, spaced upper and lower attachment tracks 39, 40 protruding therefrom and running longitudinally therealong. Track 39 includes a triangular cross-section having a circular protuberance 42 at its apex. Sides 43, 44 of the triangle of track 39 complement the radially-directed walls 32, 33 of cutout 30, and protuberance 42 complements the diameter of hollow 27', so that the length of cabling 10' can be snap-fit onto track 39 to secure the same to the mounting strip 35. Track 40 is identically formed to receive a second length of cable 10' in snap-fitting relationship similarly thereon.

Track 35 can be positioned as desired around a swimming pool, walkway, sign, or other structure to be illuminated or accented by lateral fiber optic lighting. Fasteners 46 may be passed through bores 47 located in axially-spaced placements intermediate the tracks 39, 40, in order to secure the strip 35 in position. The space 48, exposed on front surface 38 between tracks 39, 40 after mounting respective cables 10' thereon, may be made of or coated with a reflective substance to provide the effect of continuous lateral illumination from the top edge 49 to the bottom edge 50 along the strip 35. As with cable 10, one or more light sources 52 are directed axially into one or both ends of each cable 10'.

Figure 4:
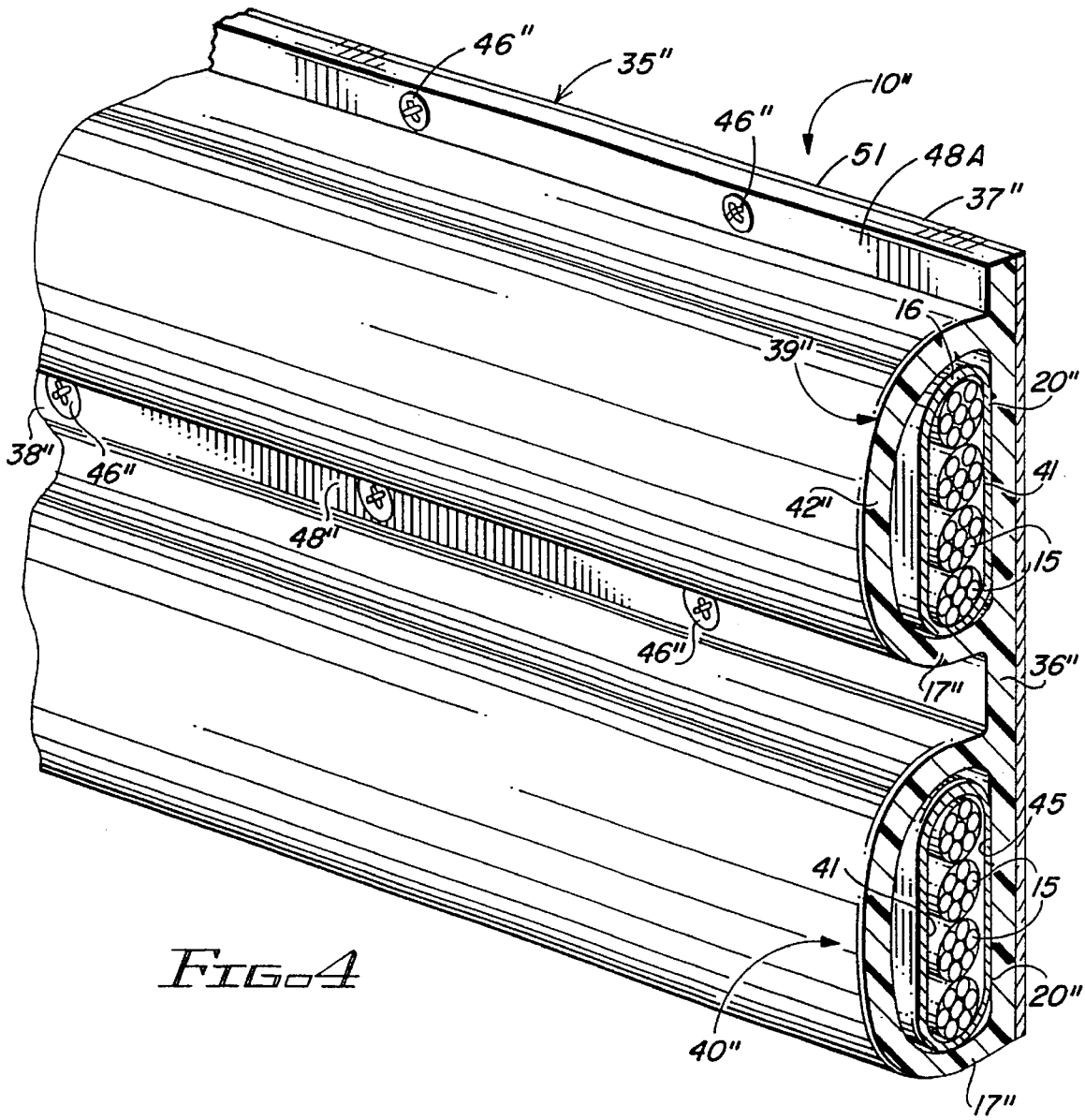
FIG. 4 is a fragmentary view, in section, of another form of the modified embodiment of FIG. 3.

FIG. 4 illustrates another cable device 10" similar to device 10' of FIG. 3, but which integrates the functions of core 12' and sheath 17' in a modified mounting strip 35". Strip 35" has a base 36" with a vertically planar rear surface 37" and a front surface 38" having spaced upper and lower tracks 39", 40" protruding therefrom and running longitudinally therealong. Each track 39", 40" comprises an arcuate segment 42" defining an interior longitudinally extending channel 41 through which a plurality of pregrouped bundles 15 of fibers 16 are inserted. The rear surface 45 of each channel 41 is made reflective, as is the space 48" exposed on the front surface 38" between tracks 39", 40". This can be done by using a clear material for the strip 35" and applying a reflective substance over the surfaces 45 and space 48" or, as shown, by applying a reflective material, such as a white or metallic foil backing 51, over the surface 35". The device 10" can be readily manufactured by collecting bundles 15 into upper and lower groupings, wrapping a clear protective covering 20" over the separate bundle groupings, then passing the same through an extruder which forms the mounting strip profile about the groupings. In this case, the rear surfaces 45 of the channels 41 serve the purpose of the reflective core 12", and the segments 42" perform the role of the casing sheath 17". A mounting flange 48A, corresponding to the flange in space 48" may be formed on either side of each channel 41 to enable mounting of the channels using screws 46". While shown as a pair of channels 41, it will be recognized that only one channel could be used.

Still another variation of the various embodiments of the invention is to form an outer sheath 17A as a separate tube and thereafter insert the bundled fiber optics into the preformed tube as shown in FIG. 5. One advantage of this method is that the sheath 17A may be formed of an opaque material with various openings cut through the walls of the sheath. For example, one could form star-shaped, triangular shaped and circular openings 55 in the sheath sidewall so that the assembled cable would appear as a plurality of spaced designs of stars, triangles and circles. Merely using an opaque sheath with rectangular openings could produce a useful cable for identifying walkways in darkened corridors. The opaque sheath 17A concept is applicable to each of the embodiments of FIGS. 1, 3 and 4. In practice, it may be preferred to create the cable device 10 using the method of FIG. 2 and then slide the cable device into another outer sheath of opaque material having desired cut-out portions as shown in FIG. 6. Note that the cable 10 is essentially identical to the cable 10 of FIG. 1 and is inserted in a preformed channel 57 having apertures 59. The apertures 59 can take any desired shape such as the illustrated circle and star as well as rectangles, triangles and other designs. The light from laterally illuminating cable 10 glows through the apertures 59 in the channel 57. The channel may be formed or extruded with mounting flanges 61 adapted to be drilled for mounting screws 63, similar to the extruded channels shown in FIG. 4.

Though the cable devices 10, 10', 10" are shown filled with fibers 16 prewound into bundles 15, it will be understood that the same devices can be achieved using individual unbundled fibers, if preferred. Moreover, those skilled in the art to which the invention relates will appreciate that other substitutions and modifications can also be made to the described embodiments, without departing from the spirit and scope of the invention as encompassed by the claims below.

What is claimed is:

1. A lateral illumination fiber optic cable device, comprising:

a central core having an axially extending light reflective outer surface;

a plurality of optical fibers distributed circumferentially about the core and extending axially along the reflective surface; and a transparent tubular sheath running longitudinally, coaxially of the core about the optical fibers.

2. A device as in claim 1 wherein the central core comprises a flexible, shape retentive material enabling the device to be bent into various shapes.

3. A device as in claim 1 wherein the central core comprises an electrical cable.

4. A device as in claim 1 wherein the optical fibers comprise a plurality of bundles of optical fibers.

5. A device as in claim 1 wherein the optical fibers are wound in successive layers about the central core.

6. A device as in claim 1 wherein the central core comprises a hollow tube and including an electrical cable extending axially through the tube.

7. A lateral illumination fiber optic cable device comprising:

a plurality of bundles of optical fibers, each fiber including a core of material transparent to radiation in an optical wavelength and having a layer of cladding material overlaying the fiber core, each bundle comprising a plurality of said optical fibers, said optical fibers being formed with a plurality of bends in the fibers for enhancing lateral illumination at the expense of axial transmission of light;

a tubular core having a diameter substantially greater than a diameter of said each bundle of optical fibers;

said plurality of bundles of optical fibers being generally uniformly distributed at equiangular intervals about at least a major portion of a circumferential extent of said tubular core and extending axially along said tubular core; and an outer sheath overlaying at least said bundles of optical fibers and said circumferential extent of said tubular core.

8. A device as in claim 7 wherein the sheath comprises an opaque, flexible material having a plurality of spaced cut-out portions for passing lateral illumination from the optical fibers.

9. A device as in claim 7 wherein the central core includes an outer reflective surface.

10. A device as in claim 9 wherein the central core comprises a hollow tube.

11. A device as in claim 7 wherein the core has a non-circular cross-section.

12. A device as in claim 7 and including in combination a channel formed of an opaque material and having a plurality of apertures passing therethrough, the device being placed within the channel whereby lateral illumination from the device is directed outwardly through the apertures.

13. A device as in claim 12 wherein the channel is formed with laterally extending flanges to enable mounting of the channel to a support structure.

14. A device as in claim 7 and wherein said sheath comprises a channel formed of an opaque material and having a plurality of apertures passing therethrough whereby lateral illumination from the device is directed outwardly through the apertures.

15. A lateral illumination optical fiber lighting system comprising:

a longitudinally extending mounting strip having front and rear surfaces;

a first plurality of optical fibers having ends;

means mounting the first plurality of optical fibers to extend longitudinally along the front surface of the mounting strip;

a light source directed into the ends for providing lateral illumination from the fibers; and the means mounting the plurality of fibers including means located rearwardly of the fibers for reflecting rearwardly directed lateral illumination forwardly.

16. A system as in claim 15 further comprising means located at the space for securing the strip to a supporting structure.

17. A system as in claim 16 and including at least one flange extending laterally from the mounting means and extending parallel thereto for enabling attachment of the mounting means to a support structure.

* * * * *